(12) United States Patent
Balk et al.

(10) Patent No.: US 12,722,909 B2
(45) Date of Patent: Sep. 1, 2026

(54) CROSS-BELT SORTER

(71) Applicant: EUROSORT B.V., 's-Graveland (NL)

(72) Inventors: Wouter Balk, Baambrugge (NL); Patrick Theodorus Johannes Van Haaster, De Zilk (NL); Martinus Fredericus Johannes Duivenvoorden, De Zilk (NL)

(73) Assignee: EUROSORT B.V., 's-Graveland (NL)

( * ) Notice: Subject to any disclaimer, the term of this patent is extended or adjusted under 35 U.S.C. 154(b) by 67 days.

(21) Appl. No.: 18/824,343

(22) Filed: Sep. 4, 2024

(65) Prior Publication Data

US 2024/0425300 A1 Dec. 26, 2024

Related U.S. Application Data

(63) Continuation of application No. 17/426,291, filed as application No. PCT/EP2020/053688 on Feb. 13, 2020, now Pat. No. 12,110,191.

(30) Foreign Application Priority Data

Feb. 18, 2019 (EP) .................................... 19157749

(51) Int. Cl.
*B65G 47/82* (2006.01)
*B65G 15/30* (2006.01)
*B65G 47/96* (2006.01)

(52) U.S. Cl.
CPC ............. *B65G 47/82* (2013.01); *B65G 15/30* (2013.01); *B65G 47/962* (2013.01)

(58) Field of Classification Search
CPC ....... B65G 47/82; B65G 15/30; B65G 47/962
(Continued)

(56) References Cited

U.S. PATENT DOCUMENTS 3,739,902 A 6/1973 Ingram et al.
6,360,877 B1 * 3/2002 Orillo .................... B65G 17/46 198/803.5

(Continued)

FOREIGN PATENT DOCUMENTS

CN 1508054 A 6/2004
CN 208199570 U 12/2018

(Continued)

OTHER PUBLICATIONS

EP3696122 (Year: 2020).*

(Continued)

*Primary Examiner* — Gene O Crawford
*Assistant Examiner* — Lester Rushin, III
(74) *Attorney, Agent, or Firm* — Mendelsohn Dunleavy, P.C.; Kevin J. Dunleavy

(57) ABSTRACT

A cross-belt sorter with a plurality of interconnected carriers drivable behind each other in a conveying direction. Each carrier is provided with a cross-belt for supporting a product. The cross-belt is drivable in a belt driving direction extending transversely to the conveying direction. A pushing element is mounted to the cross-belt for pushing against a product on the cross-belt in the event that a product on the cross-belt tends to move with respect to the cross-belt in opposite direction of the belt driving direction. The pushing element has an upright orientation with respect to the cross-belt and is supported in the belt driving direction by a supporting member which is at least between opposite side
(Continued)

edges of the cross-belt fixed to the pushing element and to the cross-belt at respective distances from an intersection between the pushing element and the cross-belt.

21 Claims, 7 Drawing Sheets

(58) Field of Classification Search
USPC .......................................................... 198/367
See application file for complete search history.

(56) References Cited

U.S. PATENT DOCUMENTS

| | | | | |
|---|---|---|---|---|
| 6,814,216 | B2 * | 11/2004 | Veit | B07C 5/362 198/370.02 |
| 7,987,963 | B2 | 8/2011 | Baum et al. | |
| 8,413,787 | B2 | 4/2013 | Brouwer et al. | |
| 9,212,006 | B1 | 12/2015 | Platiau | |
| 9,259,102 | B2 | 2/2016 | Hardy et al. | |
| 9,371,194 | B2 * | 6/2016 | Ragan | B65G 17/345 |
| 9,820,585 | B2 | 11/2017 | Hardy et al. | |
| 9,828,187 | B2 * | 11/2017 | Chierego | B65G 43/08 |
| 11,820,605 | B2 | 11/2023 | Wagner et al. | |
| 2003/0221935 | A1 | 12/2003 | Barklin et al. | |
| 2010/0275555 | A1 * | 11/2010 | Weagant | B65B 37/02 137/593 |
| 2011/0220459 | A1 * | 9/2011 | Brouwer | B65G 47/50 198/370.02 |
| 2016/0257501 | A1 | 9/2016 | Chierego et al. | |
| 2019/0337731 | A1 * | 11/2019 | Bastian, II | B65G 47/28 |
| 2023/0391560 | A1 * | 12/2023 | Wagner | G05B 19/4189 |

FOREIGN PATENT DOCUMENTS

| | | | |
|---|---|---|---|
| EP | 0878420 | A2 | 11/1998 |
| EP | 1167248 | A1 | 1/2002 |
| FR | 2475015 | A3 | 8/1981 |
| GB | 1506135 | A | 4/1978 |
| JP | S60-002507 | A | 1/1985 |
| JP | H05-56830 | U | 7/1993 |
| JP | HO719236 | U | 4/1995 |
| JP | H07-30580 | Y2 | 7/1995 |
| JP | H07-61811 | B2 | 7/1995 |
| JP | H09-040160 | A | 2/1997 |
| JP | 2006-027906 | A | 2/2006 |
| JP | 2012-153490 | A | 8/2012 |
| JP | 2012-217897 | A | 11/2012 |
| JP | 2012-236119 | A | 12/2012 |
| JP | 2013-159469 | A | 8/2013 |
| WO | 0032502 | A1 | 6/2000 |

OTHER PUBLICATIONS

International Search Report and Written Opinion for corresponding International application No. PCT/EP2020/053688; dated Jul. 6, 2020 (11 pages).

First Office Action for corresponding Chinese application No. 202080014810.6; dated Jan. 28, 2023 (22 pages) Machine Translation.

Notice of Reasons for Rejection for corresponding Japanese application No. 2021-547806; dated Feb. 6, 2024 (11 pages).

* cited by examiner

CROSS-BELT SORTER

CROSS REFERENCE TO RELATED APPLICATIONS

This application is a continuation of U.S. patent application Ser. No. 17/426,291, filed on Jul. 28, 2021, currently pending, which, in turn is a 371 continuation of PCT/EP2020/05388, filed on Feb. 13, 2020, which, in turn, claims priority to European patent application no. 19157749.3 filed on Feb. 18, 2019, the entire disclosures of which are hereby incorporated in their entirety as if fully set forth herein.

BACKGROUND OF THE INVENTION

The present invention relates to a cross-belt sorter, comprising a plurality of interconnected carriers which are drivable behind each other in a conveying direction, wherein each of the carriers is provided with a cross-belt for supporting a product, which cross-belt is drivable in a belt driving direction extending transversely to the conveying direction, wherein a pushing element is mounted to the cross-belt for pushing against a product on the cross-belt in the event that a product on the cross-belt tends to move with respect to the cross-belt in opposite direction of the belt driving direction, wherein the pushing element has an upright orientation with respect to the cross-belt.

Such a cross-belt sorter is known from US 2016/0257501. A disadvantage of the known cross-belt sorter is that the pushing element will bend when a heavy product must be discharged or when the pushing element hits the product at a relatively high speed. As a consequence, a product may move in the wrong direction across the bent pushing element. If a more rigid pushing element is installed the shape of the pushing element itself may remain the same but the cross-belt may be deformed at the location where the pushing belt is fixed to the cross-belt when a heavy product must be pushed, such that the pushing element tends to incline backwards. This would result in the same disadvantage as mentioned above.

An object of the invention is to provide an improved cross-belt sorter.

BRIEF SUMMARY OF THE INVENTION

This object is accomplished with the cross-belt sorter according to the invention, wherein the pushing element is supported in the belt driving direction by a supporting member which is at least between opposite side edges of the cross-belt fixed to the pushing element and to the cross-belt at respective distances from an intersection between the pushing element and the cross-belt.

An advantage of fixing the pushing element and the supporting member to the cross-belt at a distance from each other in the belt driving direction is that the pushing element does not require a rigid basis at the intersection between the pushing element and the cross-belt for avoiding tilting of the pushing element in case of pushing a product from the carrier. The rigidity of the pushing element in longitudinal direction of the cross-belt is created by the presence of the supporting member. This allows to apply a light-weight and non-rigid pushing element.

In a particular embodiment the smallest angle of the pushing element with respect to the cross-belt is larger than the smallest angle of the supporting member with respect to the cross-belt. This means that the pushing element has a steeper orientation with respect to the cross-belt than the supporting member. In fact, the supporting member forms a raker or inclined strut to minimize deformation of the pushing element upon pushing a product from the carrier.

At least one of the pushing element and the supporting member may have a plate shape extending in transverse direction of the belt conveying direction. The plate-shaped pushing element and supporting member may cover the entire cross-belt between the opposite side edges of the cross-belt.

The pushing element and the supporting member may be pivotably mounted to each other and to the cross-belt. This allows a portion of the cross-belt where the pushing element and the supporting member are located to be guided along a cross-belt reverse roller without creating internal forces due to mutual displacements of the pushing element and the supporting member during passing such a cross-belt reverse roller. It is noted that cross-belt reverse rollers may be located at opposite sides of the carrier.

The pushing element and the supporting member may be made of the same material, for example an elastic plastic.

The pushing element and the supporting member may be an integral unit. If the supporting member and the pushing element are pivotably mounted to each other the pivot may be a living hinge. The integral unit can be fixed to the cross-belt by an adhesive, for example.

The pushing element and the supporting element may form a first pushing element and a first supporting element, whereas second pushing and supporting elements similar to the first pushing and supporting elements are mounted to the cross-belt, wherein the first and second pushing elements face each other in a transport position of the cross-belt. This means that the cross-belt can be operated in opposite directions to discharge products to the left or the right when travelling in the conveying direction. When the conveyor belt is in the transport position the product can be placed onto the cross-belt and transported towards a discharging station where the cross-belt is activated such that its position changes from the transport position to a discharge position. In this case one of the pairs of the pushing element and supporting member may pass a cross-belt reverse roller.

The cross-belt may be drivable in opposite directions by means of a follower which engages the cross-belt and which is located at a lower side of the carrier and guidable by controllable guides such that the cross-belt is driven by the follower in one of the directions upon passing an activated guide.

The cross-belt may be guided by cross-belt reverse rollers at opposite sides of the carrier, wherein adjacent to at least one of the cross-belt reverse rollers the carrier is provided with an inclination guide for guiding the cross-belt between the cross-belt reverse roller and an elevated level above the cross-belt reverse roller at a distance from the cross-belt reverse roller. An advantage of this embodiment is that products are discharged more easily because of the inclination at the end of the carrier in lateral direction.

The inclination guide may have a gradual inclination, i.e. without sudden height variations.

In a particular embodiment each of the carriers is provided with a carrier frame wherein the cross-belt is movable with respect to the carrier frame in the belt driving direction and guided over cross-belt reverse rollers at opposite sides of the carrier, wherein the cross-belt has a product supporting section which extends between the cross-belt reverse rollers in a transport position of the cross-belt and two reverse portions at either side of the product supporting section, respectively, which reverse portions extend below the product supporting section in the transport position, wherein each reverse portion has a first reverse section extending from one of the cross-belt reverse rollers to a dynamic reverse roller for turning the reverse portion upside down, which dynamic reverse roller is rotatably mounted to a carriage that is movable with respect to the carrier frame opposite to the belt driving direction, and a second reverse section located below the first reverse section and extending away from the dynamic reverse roller, which second reverse section is fixed to the carrier frame at a distance from the dynamic reverse roller or to the carriage via an additional reverse roller at the carrier frame, wherein each reverse portion is separated into two parts for providing an opening, between which the carriage can move with respect to the carrier frame. Since the carriage can move between the separate parts the carriage can be compact in the conveying direction.

It is noted that the belt driving direction should be interpreted as being the direction in which the cross-belt moves at the top of the carrier, hence in which direction a product on the carrier must be discharged. Due to the configuration of the cross-belt about the cross-belt reverse rollers and the dynamic reverse rollers, and if applicable the additional rollers, the carriage moves in opposite direction of the belt driving direction.

The opening may be located at a center of the cross-belt as seen in the conveying direction.

In another particular embodiment each of the carriers is provided with a carrier frame and the cross-belt is movable with respect to the carrier frame in the belt driving direction and guided over cross-belt reverse rollers at opposite sides of the carrier, wherein the cross-belt has a product supporting section which extends between the cross-belt reverse rollers in a transport position of the cross-belt and two reverse portions at either side of the product supporting section, respectively, which reverse portions extend below the product supporting section in the transport position, wherein each reverse portion has a first reverse section extending from one of the cross-belt reverse rollers to a common reverse roller for turning the reverse portion upside down, which common reverse roller is rotatably mounted to a carriage that is movable with respect to the carrier frame opposite to the belt driving direction, and a second reverse section located below the first reverse section and extending away from the common reverse roller, which second reverse section is fixed to the carrier frame at a distance from the common reverse roller or to the carriage via an additional reverse roller at the carrier frame, wherein the first and second reverse sections of each reverse portion have an offset with respect to each other in longitudinal direction of the common reverse roller. The offset allows to apply the common reverse roller instead of two dynamic reverse rollers as described hereinbefore. When each carrier is provided with a single common reverse roller, the cross-belt sorter has less parts, leading to a relatively low-cost apparatus. The first and second reverse sections may comprise a plurality of strips in offset arrangement in order to distribute forces on the common reverse roller evenly. Furthermore, the width of the cross-belt at the first and second reverse sections may be smaller than the width at the product supporting section.

The carriage may be provided with a follower which is located at a lower side of the carrier and guidable by controllable guides such that the carriage is driven upon passing an activated guide.

In still another particular embodiment the cross-belt is guided by cross-belt reverse rollers at opposite sides of the carrier, wherein the cross-belt has a product supporting section between the cross-belt reverse rollers in a transport position of the cross-belt, wherein the upper surface of the product supporting section has a central region which has a higher friction coefficient than an end region thereof extending between the central region and one of the cross-belt reverse rollers which is located with respect to the other cross-belt reverse roller in opposite direction of the belt driving direction. In the transport position the pushing element may be located at or close to one of the cross-belt reverse rollers and extend in upward direction.

BRIEF DESCRIPTION OF THE SEVERAL VIEWS OF THE DRAWING

The invention will hereafter be elucidated with reference to very schematic drawings showing embodiments of the invention by way of example.

DETAILED DESCRIPTION OF THE INVENTION

Figure 1:
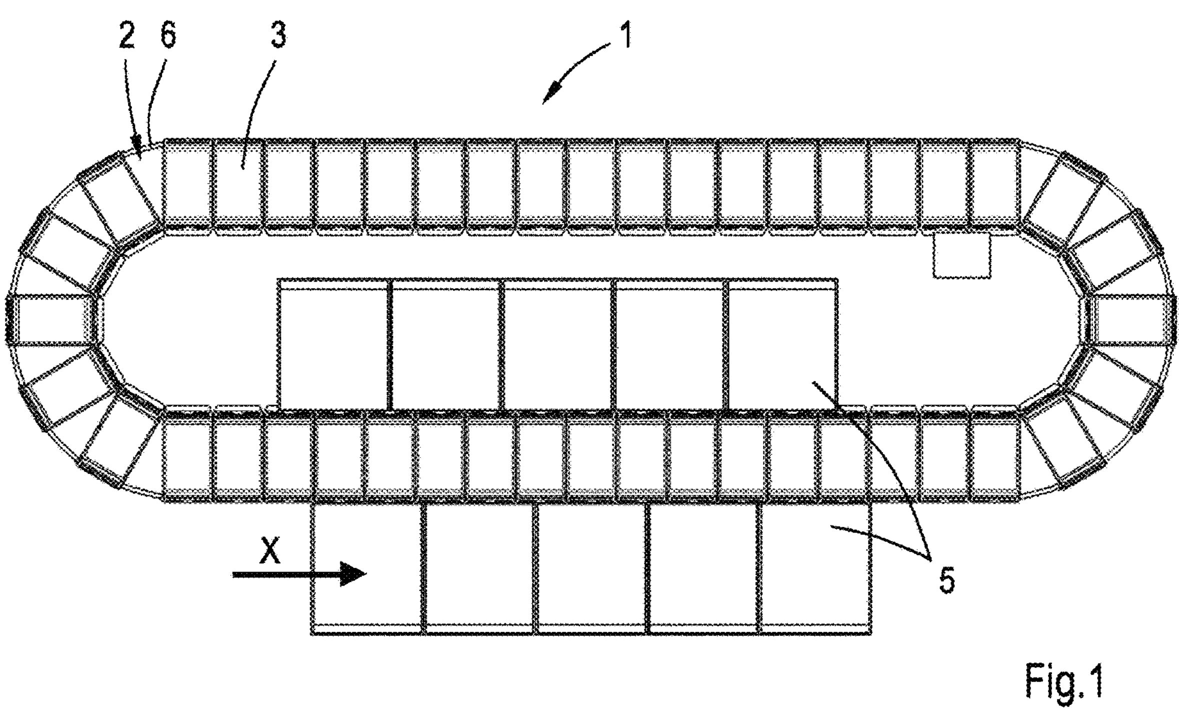
FIG. 1 is a plan view of an embodiment of a cross-belt sorter according to the invention.

FIG. 1 shows an embodiment of a cross-belt sorter 1 according to the invention. The cross-belt sorter 1 is suitable for sorting products per destination and distributing them over dispatch boxes for the various destinations in a controlled manner. The cross-belt sorter 1 is constructed around a fixedly disposed sorter frame 2 and comprises a plurality of separate carriers 3. The carriers 3 are interconnected through pivoting links, hence forming an endless train of carriers 3 along a closed track. The cross-belt sorter 1 is provided with a drive means for driving the train of carriers 3 behind each other in a conveying direction X. The drive means may comprise drivable rollers located along the track and which engage and drive one or more passing carriers 3 through friction between the rollers and the carrier(s) 3, but numerous alternative means for driving the carriers 3 behind each other are conceivable. Each carrier 3 is able to receive a product and discharge it selectively at the intended location.

Figure 5:
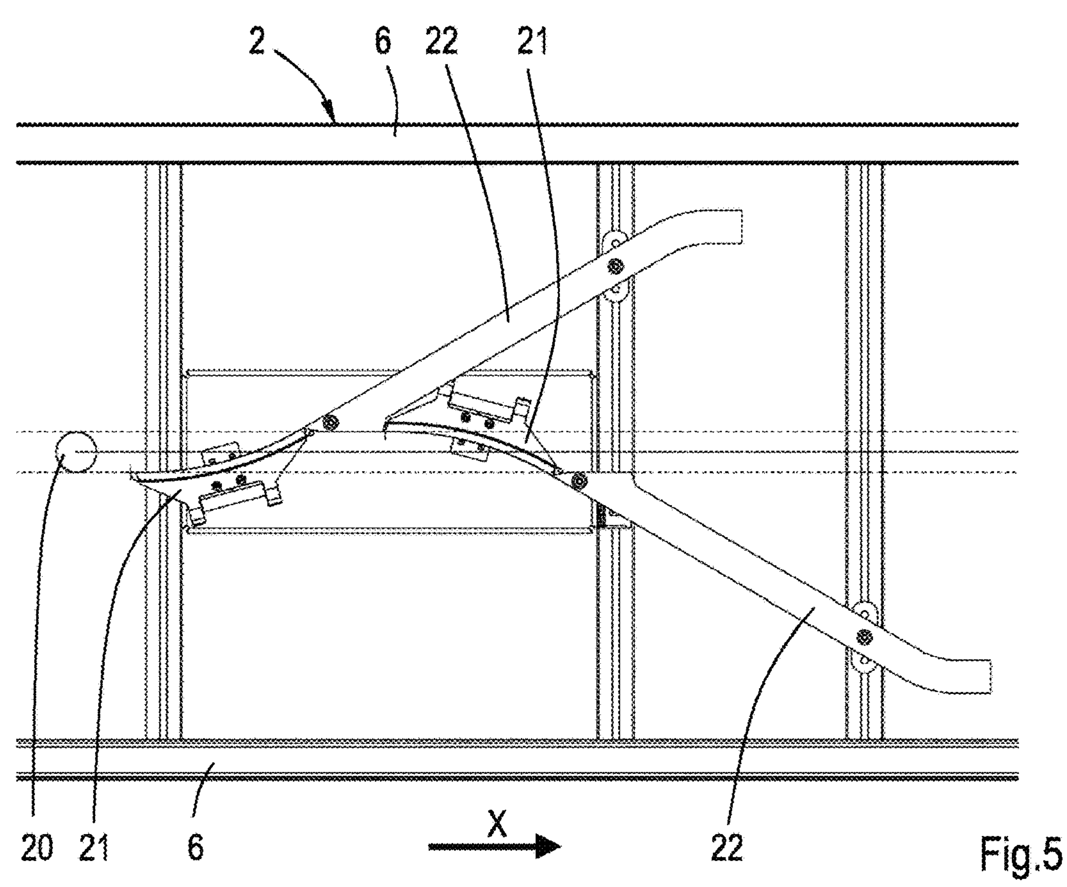
FIG. 5 is a plan view of a part of the sorter frame extending below the carriers.

The carriers 3 are guided along guide rails 6 in the conveying direction X, see FIGS. 1 and 5. As can be seen in FIG. 1, the carriers 3 spread apart in the bends and draw closer together again after the bends in the straight parts of the track.

The sorter 1 may comprise one or more loading stations (not shown). It has several discharging stations 5 along the track that is followed by the carriers 3. At the position of a loading station products are placed, optionally manually, on the carriers 3, while at the discharging stations 5 dispatch boxes are disposed at both sides of the track to receive products for a specific destination. The discharging stations 5 may comprise chutes, for examples, from which operators can pick discharged products.

Figure 2:
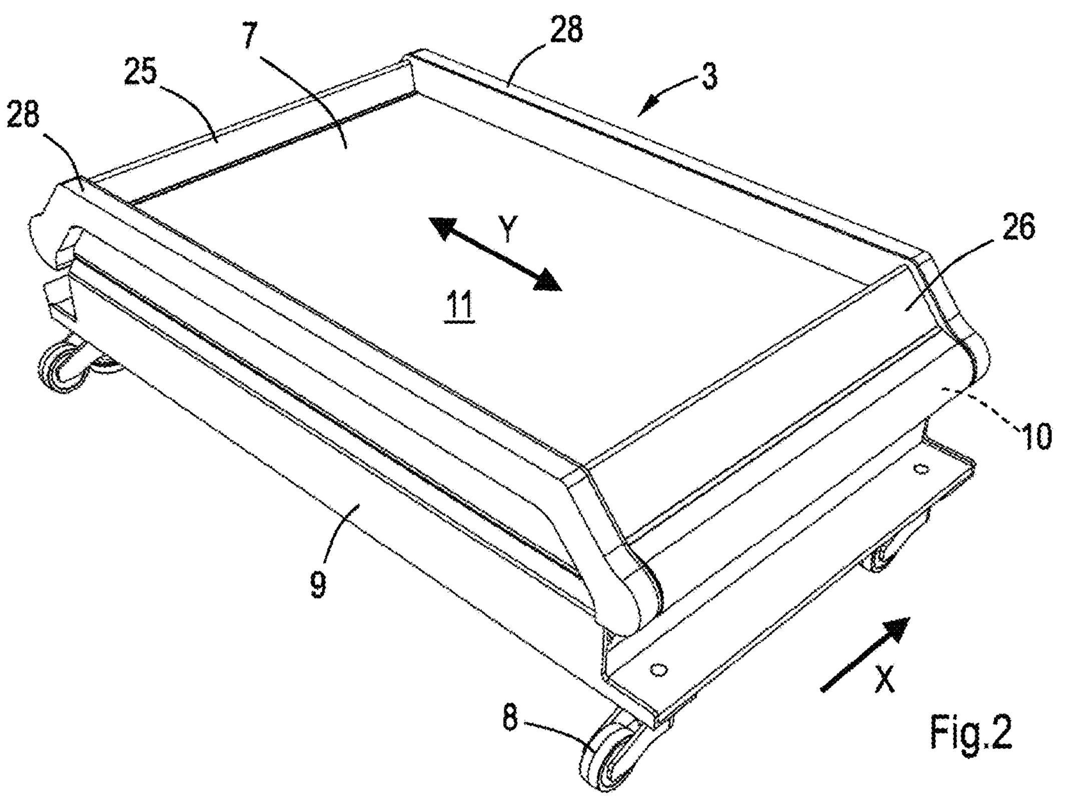
FIG. 2 is a perspective view of one of the carriers of the cross-belt sorter of FIG. 1.
Figure 3:
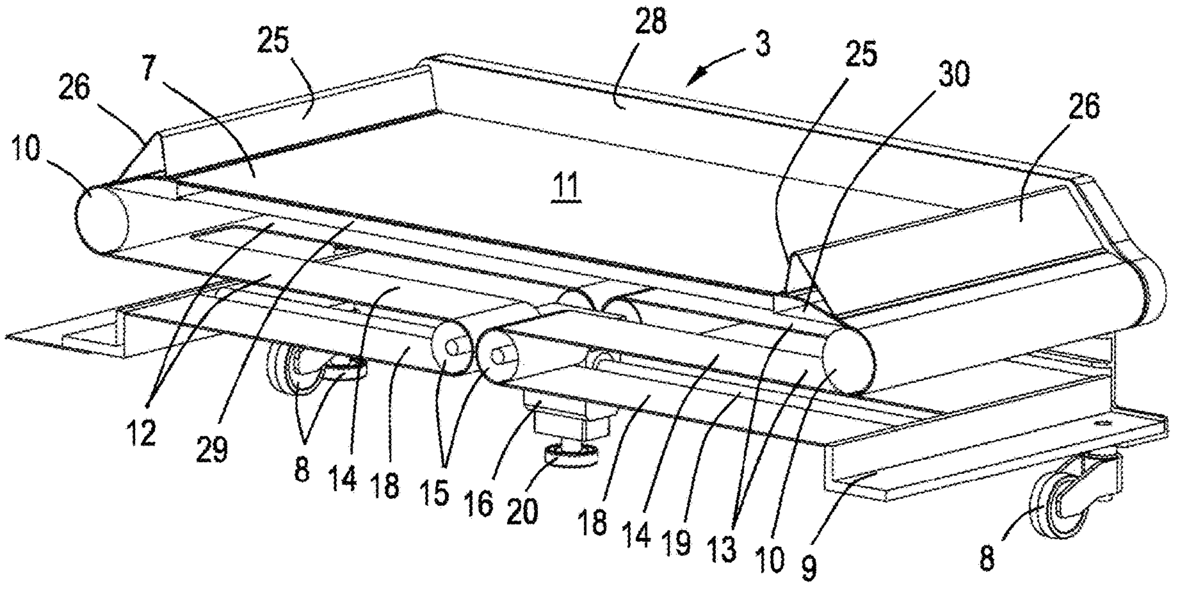
FIG. 3 is a perspective sectional view of the carrier of FIG. 2.
Figure 4:
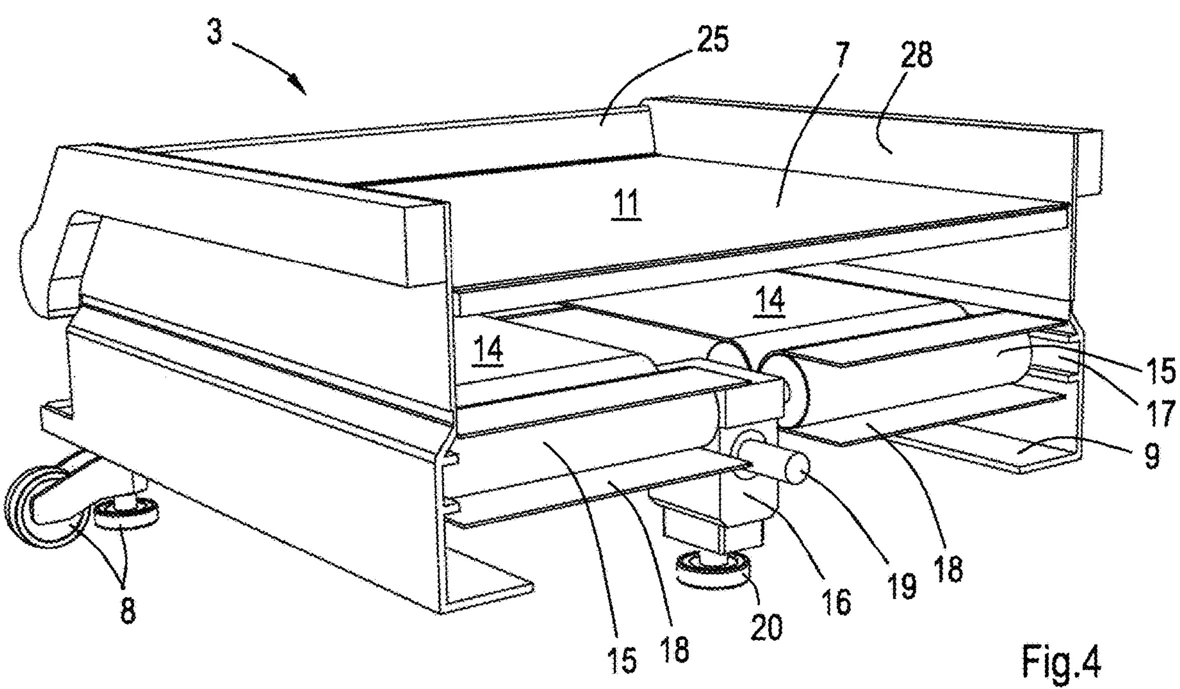
FIG. 4 is a similar view as FIG. 3, but seen from a different direction.

Each of the carriers 3 comprises a cross-belt 7 which is moveable in opposite belt driving directions Y which extend transversely with respect to the conveying direction X, see FIG. 2. This allows to discharge a product from the carrier 3 at the desired discharging station 5. FIGS. 2-4 show one of the carriers 3 in more detail. Each carrier 3 is provided with guide wheels 8 which run on the guide rails 6, see FIG. 5. In the embodiment as shown in FIGS. 2-4 the carrier 7 can discharge products in both lateral directions Y.

FIGS. 3-7 show a mechanism for driving the cross-belt 7. The carrier 3 is provided with a carrier frame 9 and cross-belt reverse rollers 10 which are located at opposite sides of the carrier 3 and rotatably mounted to the carrier frame 9. FIGS. 2-4 show the cross-belt 7 in a transport position which is a neutral position in which a product can be supported by the cross-belt 7 and transported in the conveying direction X. When driving the cross-belt 7, it is turned upside down at the cross-belt reverse rollers 10. The cross-belt 7 has a product supporting section 11 which extends between the cross-belt reverse rollers 10 in the transport position and two reverse portions 12, 13. The reverse portions 12, 13 extend at opposite sides of the product supporting section 11 as seen along the cross-belt 7. The reverse portions 12, 13 extend below the product supporting section 11 in the transport position. Each of the reverse sections 12, 13 is separated into two parts leaving a common opening between the parts in the conveying direction X.

Furthermore, each of the reverse portions 12, 13 has a first reverse section 14 extending from the respective cross-belt reverse rollers 10 to respective dynamic reverse rollers or follower reverse rollers 15. The follower reverse rollers 15 are rotatably mounted to a carriage or follower 16 and their rotating shafts are slidably guided by reverse roller guides 17 at the carrier frame 9, as shown in FIG. 4. When driving the cross-belt 7, one of the reverse portions 12, 13 is turned upside down at one of the cross-belt reverse rollers 10 and both are turned upside down at the follower reverse rollers 15. Each of the reverse portions 12, 13 has also a second reverse section 18 located below the first reverse section 14 and extending away from the cooperating follower reverse rollers 15. The second reverse sections 18 are fixed to the carrier frame 9 at a distance from the follower reverse rollers 15. Due to the configuration of the cross-belt 7 a displacement of the follower 16 in one direction leads to a double displacement of the product supporting section 11 in opposite direction. The opening between the parts of the reverse sections 12, 13 allows the follower 16 to be located at a centre of the carrier 3 as seen in the conveying direction X and to move between the parts in transverse direction of the conveying direction X. The carrier 3 has two parallel follower reverse rollers 15 which are each subdivided in two partial rollers that are aligned with respect to each other and that have a common axis of rotation.

It is noted that in an alternative embodiment (not shown) the second sections 18 may be fixed to the follower 16 via respective additional reverse rollers at the carrier frame 9. In this case each reverse portion 12, 13 runs along the respective follower reverse rollers 15 at the follower 16 and the respective additional reverse rollers at the carrier frame 9. In fact, a third reverse section is created below the second reverse section 18. When moving the follower 16 in one direction the product supporting section 11 will move in opposite direction by more than a double displacement in this case.

The carrier frame 9 is provided with a guide rod 19 for guiding the follower 16 transversely to the conveying direction X. The follower 16 comprises a freely rotatable wheel 20. In the transport position of the cross-belt 7, as shown in FIGS. 2-4, the follower 16 has a position in the middle between the guide rails 6. When a product on the cross-belt 7 must be discharged the cross-belt 7 is driven to one of the lateral directions Y by an adjustable diverting guide 21 for directing the follower 16 towards an inclined slider 22 which is fixed to the sorter frame 2. FIG. 5 illustrates a condition in which the freely rotatable wheel 20 of the follower 16 is in the middle position between the guide rails 6 and approaching the diverting guides 21.

As soon as a carrier 3 approaches or passes a discharging station with a product intended therefor, a controller (not shown) will drive a relevant actuator for operating the diverting guides 21 such that the cross-belt 7 on which the product is placed will be driven and moved from its transport position to a discharge position. After passing the one or more discharging stations and discharging the product at the intended destination, the carriers 3 arrive at a resetting device (not shown) which causes the cross-belts 7 to be returned to their original transport position so as to be ready for a following lap in the sorter 1. The resetting device may comprise a gradually progressing profile which, as seen in the conveying direction X, guides the followers 16 towards the centres of the carriers 3.

Figure 6:
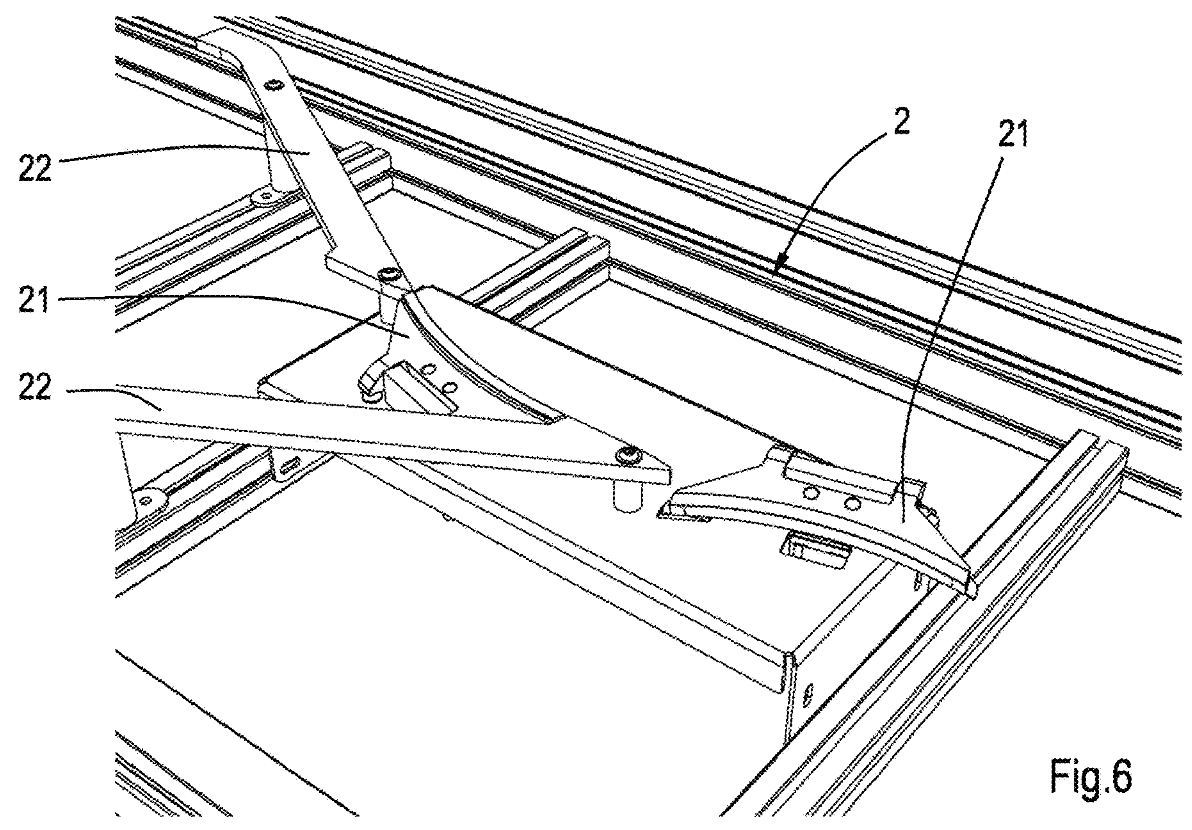
FIG. 6 is a perspective view of the part of FIG. 5.

Each of the diverting guides 21 as shown in FIGS. 5 and 6 has a curved plate which is rotatable with respect to the sorter frame 2 between a lower inactive position and an upper active position. The right diverting guide 21 in FIG. 6 is in the inactive position and the left diverting guide 21 is in the active position. Hence, the wheel 20 of the follower 16 which travels from the right to the left in FIG. 6 passes the right diverting guide 21 under operation conditions, without being forced in lateral direction Y, but it is moved in transverse direction by the left diverting guide 21.

Figure 7:
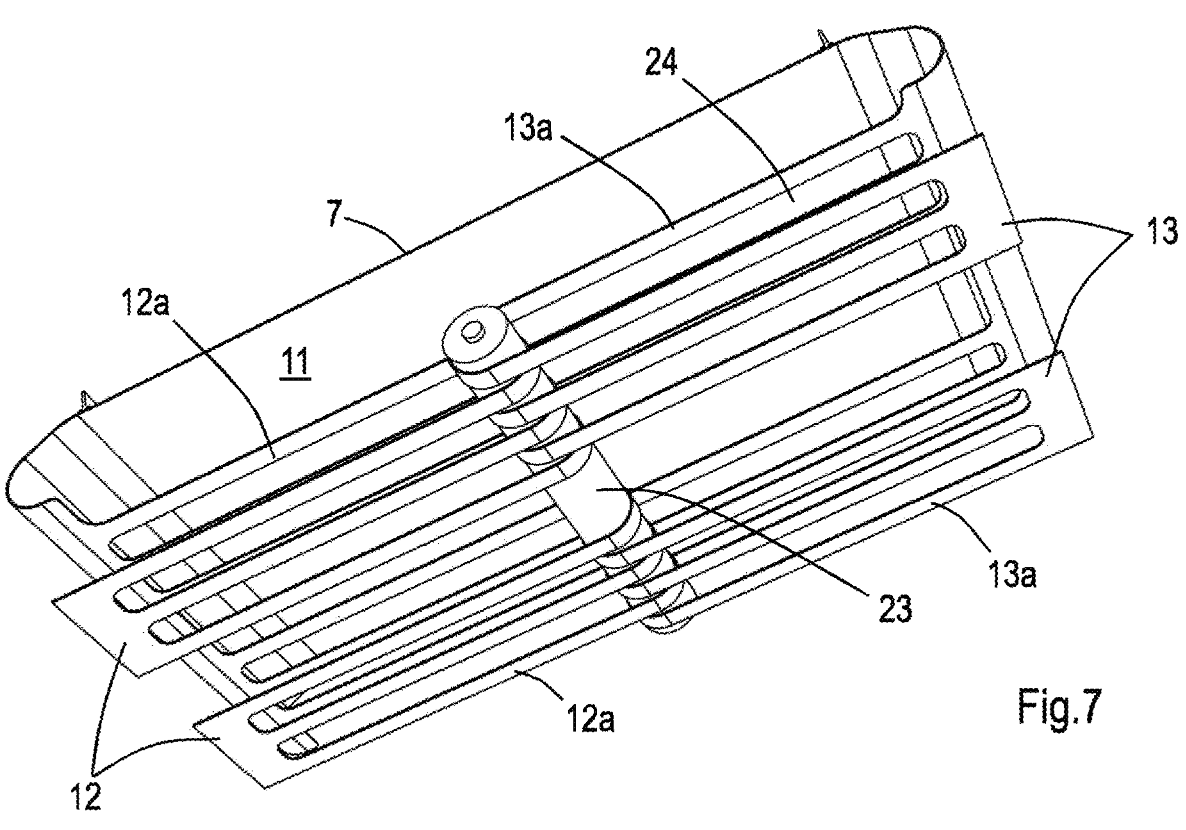
FIG. 7 is a perspective view of a cross-belt of an alternative embodiment of the cross-belt sorter.

FIG. 7 shows a part of an alternative embodiment of a carrier 3 of the cross-belt sorter 1. For explanatory reasons several parts of the carrier 3 are not shown in FIG. 7. The follower is provided with a single follower reverse roller 23 for turning the reverse portions 12, 13 upside down. Similar to the embodiment as shown in FIGS. 2-4 the cross-belt 7 is split in two pairs of reverse portions 12, 13 in order to provide space for the follower, but each of the reverse portions 12, 13 is further provided with cut-outs 24 such that resulting strips 12*a* of one reverse portion 12 at one side of the product supporting section 11 and resulting strips 13*a* of the other reverse portion 13 at the opposite side of the product supporting section 11 have an offset with respect to each other in longitudinal direction of the single follower reverse roller 23. The offset allows to use the single follower reverse roller 23. Depending on the design and location of the follower the follower reverse roller 23 may be subdivided in two rollers which are aligned with respect to each other and have a common axis of rotation.

It is noted that the embodiment as shown in FIG. 7 does not necessarily have a split cross-belt 7 in two pairs of reverse portions 12, 13 in order to provide space for the follower. In other words, the invention is also related to the following aspect:

A cross-belt sorter, comprising a plurality of interconnected carriers which are drivable behind each other in a conveying direction, wherein each of the carriers is provided with a carrier frame and a drivable cross-belt for supporting a product, which cross-belt is movable with respect to the carrier frame in a belt driving direction extending transversely to the conveying direction and guided over cross-belt reverse rollers at opposite sides of the carrier, wherein the cross-belt has a product supporting section which extends between the cross-belt reverse rollers in a transport position of the cross-belt and two reverse portions at either side of the product supporting section, respectively, which reverse portions extend below the product supporting section in the transport position, wherein each reverse portion has a first reverse section extending from one of the cross-belt reverse rollers to a common reverse roller for turning the reverse portion upside down, which common reverse roller is rotatably mounted to a carriage that is movable with respect to the carrier frame opposite to the belt driving direction, and a second reverse section located below the first reverse section and extending away from the common reverse roller, which second reverse section is fixed to the carrier frame at a distance from the common reverse roller or to the carriage via an additional reverse roller at the carrier frame, wherein the first and second reverse section of one reverse portion have an offset with respect to the first and second reverse section of the other reverse portion in longitudinal direction of the common reverse roller. The width of the cross-belt at the first and second reverse sections may be smaller than the width at the product supporting section.

Similarly, the cross-belt sorter including the split reverse portions is not necessarily related to all features of the embodiment as described hereinbefore. In other words the invention is also related to the following aspect:

A cross-belt sorter, comprising a plurality of interconnected carriers which are drivable behind each other in a conveying direction, wherein each of the carriers is provided with a carrier frame and a drivable cross-belt for supporting a product, which cross-belt is movable with respect to the carrier frame in a belt driving direction extending transversely to the conveying direction and guided over cross-belt reverse rollers at opposite sides of the carrier, wherein the cross-belt has a product supporting section which extends between the cross-belt reverse rollers in a transport position of the cross-belt and two reverse portions at either side of the product supporting section, respectively, which reverse portions extend below the product supporting section in the transport position, wherein each reverse portion has a first reverse section extending from one of the cross-belt reverse rollers to a dynamic reverse roller for turning the reverse portion upside down, which dynamic reverse roller is rotatably mounted to a carriage that is movable with respect to the carrier frame opposite to the belt driving direction, and a second reverse section located below the first reverse section and extending away from the dynamic reverse roller, which second reverse section is fixed to the carrier frame at a distance from the dynamic reverse roller or to the carriage via an additional reverse roller at the carrier frame, wherein each reverse portion is separated into two parts for providing an opening between which the carriage can move with respect to the carrier frame. In this case each carrier may have two parallel subdivided dynamic rollers as indicated in FIGS. 3 and 4.

FIGS. 2-4 show that the cross-belt 7 is provided with two similar pushing elements 25 which are located at the cross-belt reverse rollers 10 in the transport position. When a product on the cross-belt 7 must be discharged the cross-belt 7 is driven in one of the opposite belt driving directions Y. If the product tends to move with respect to the cross-belt 7 in opposite direction of the belt driving direction Y, for example caused by rolling or slipping, the pushing element 25 can push the product from the carrier 3.

Figure 8:
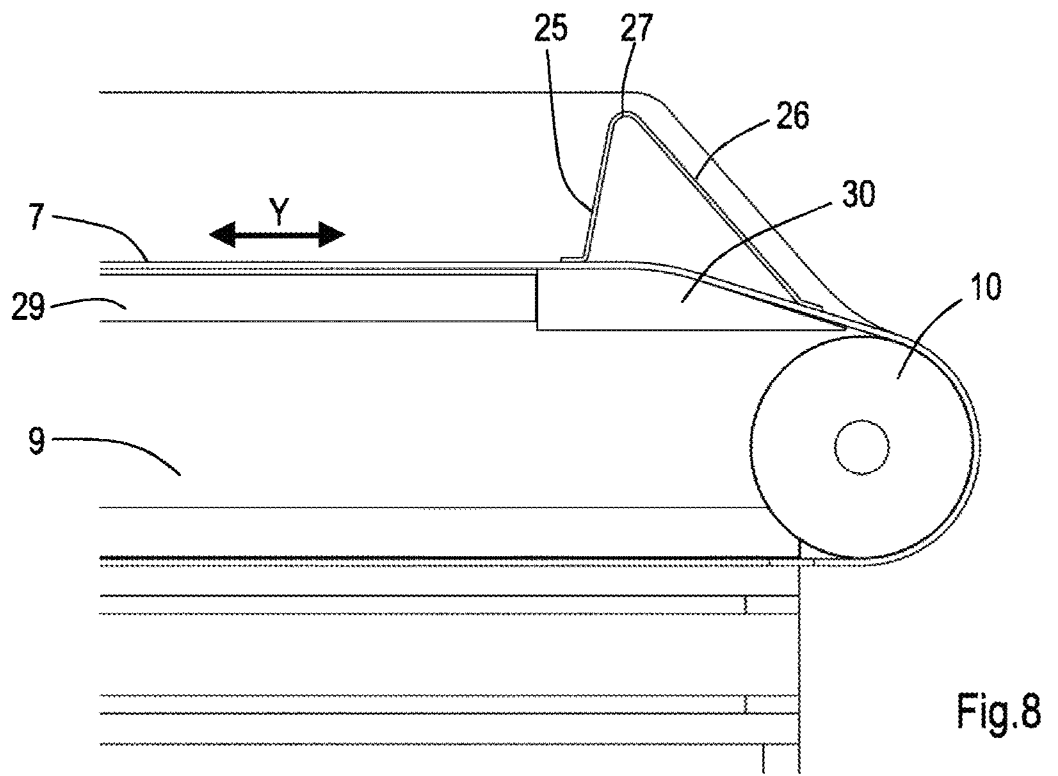
FIG. 8 is a sectional view of a part of the carrier of FIG. 2 on a large scale.

FIG. 8 shows one of the pushing elements 25 in more detail. The pushing element 25 has an upright orientation and is supported in the belt driving direction Y by a supporting member 26. In the embodiment as shown in FIG. 8 the pushing element 25 and the supporting member 26 are made of the same material, in this case a plate-shaped or sheet-shaped elastic plastic, and form an integral unit. Basically, the pushing element 25 and the supporting member 26 are thin plates which pivot with respect to each other at an intersection 27 between them, whereas the pushing element 25 has also a pivoting axis at the location where it is fixed to the cross-belt 7, and the supporting member 26 has also a pivoting axis at the location where it is fixed to the cross-belt 7, since the supporting member 26 is fixed to the cross-belt 7 at a distance from the location where the pushing element 25 is fixed to the cross-belt 7. As can be seen in FIG. 8, the pushing element 25, the supporting member 26 and a portion of the cross-belt 7 form a triangular structure in cross-section. The smallest angle of the pushing element 25 with respect to the cross-belt 7 is larger than the smallest angle of the supporting member 26 with respect to the cross-belt 7.

When the pushing element 25 and the supporting member 26 run about the cross-belt reverse roller 10 the shortest distance between the locations where they are fixed to the cross-belt 7 will vary, hence varying the angle between the pushing element 25 and the supporting member 26 during rotation about the cross-belt reverse roller 10.

The carrier 3 is also provided with side walls 28 along the cross-belt 7. The contours of the side walls 28 and the supporting members 26 match with each other such that the carrier 3 looks like a tray, see FIG. 2. The side walls 28 may be made of a foam in order to minimize weight of the carriers 3.

FIGS. 3 and 8 also show that the cross-belt 7 is supported by a central guide 29 which has an upper surface that lies at a higher level than the cross-belt reverse rollers 10. The central guide 29 is fixed to the carrier frame 9. Between the central guide 29 and each of the cross-belt reverse rollers 10 are inclination guides 30, respectively, each having an upper surface for gradually guiding the cross-belt 7 between the central guide 29 and the respective cross-belt reverse roller 10. When a product on the cross-belt 7 approaches the cross-belt reverse roller 10 during a discharging action the inclined orientation of the cross-belt 7 adjacent the cross-belt reverse roller 10 helps to discharge the product.

Is noted that the inclined cross-belt portions in the embodiment as shown in FIGS. 3 and 8 are not necessarily associated to the features related to the mechanism for driving the cross-belt 7 as described hereinbefore. In other words, the invention is also related to the following aspects:

Aspect 1: A cross-belt sorter, comprising a plurality of interconnected carriers which are drivable behind each other in a conveying direction, wherein each of the carriers is provided with a cross-belt for supporting a product, which cross-belt is drivable in a belt driving direction extending transversely to the conveying direction and guided by cross-belt reverse rollers at opposite sides of the carrier, wherein at least adjacent to one of the cross-belt reverse rollers the carrier is provided with an inclination guide for guiding the cross-belt between the cross-belt reverse roller and an elevated level above the cross-belt reverse roller at a distance from the cross-belt reverse roller.

Aspect 2: A cross-belt sorter according to aspect 1, wherein both cross-belt reverse rollers lie at the same height.

Aspect 3: A cross-belt sorter according to aspect 1 or 2, wherein a central guide for supporting the cross-belt is located beyond the inclination guide as seen from said at least one cross-belt reverse roller wherein the central guide forms said elevated level.

Aspect 4: A cross-belt sorter according to aspect 3, wherein the central guide has a horizontal upper surface for guiding the cross-belt.

Figure 9:
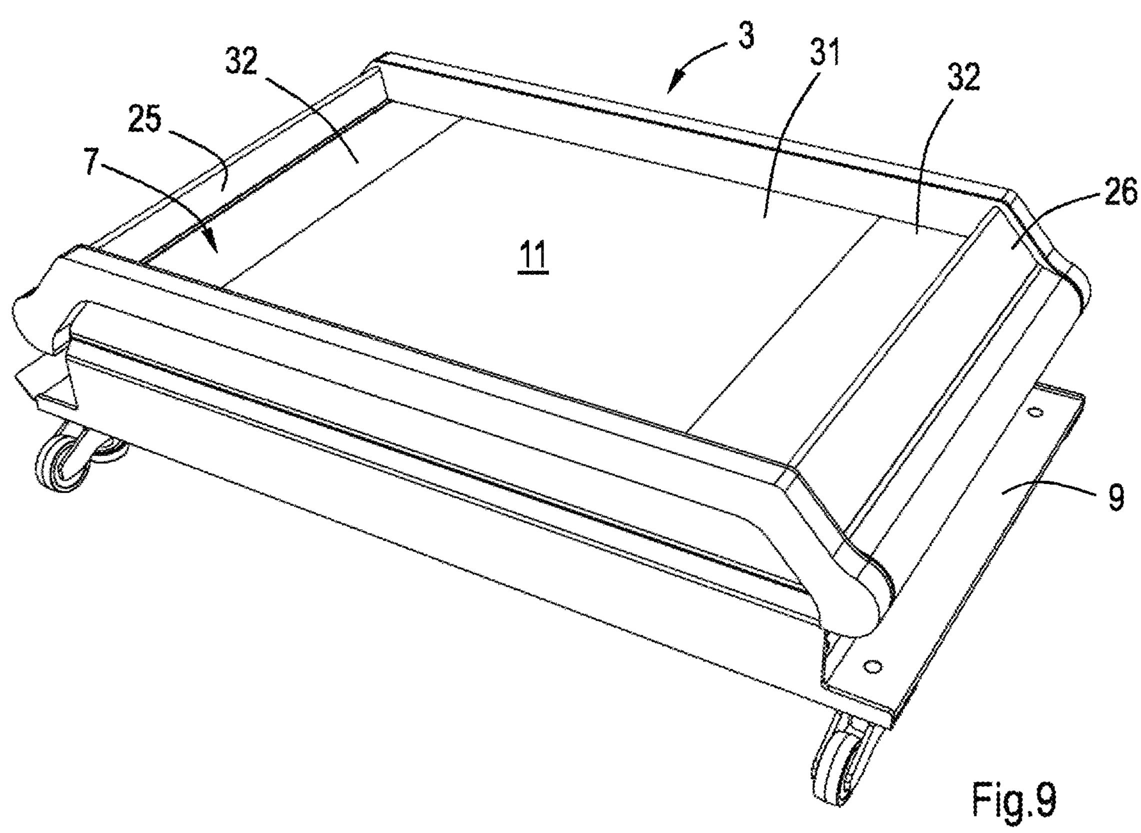
FIG. 9 is a similar view as FIG. 2, but showing an alternative embodiment.
Figure 10:
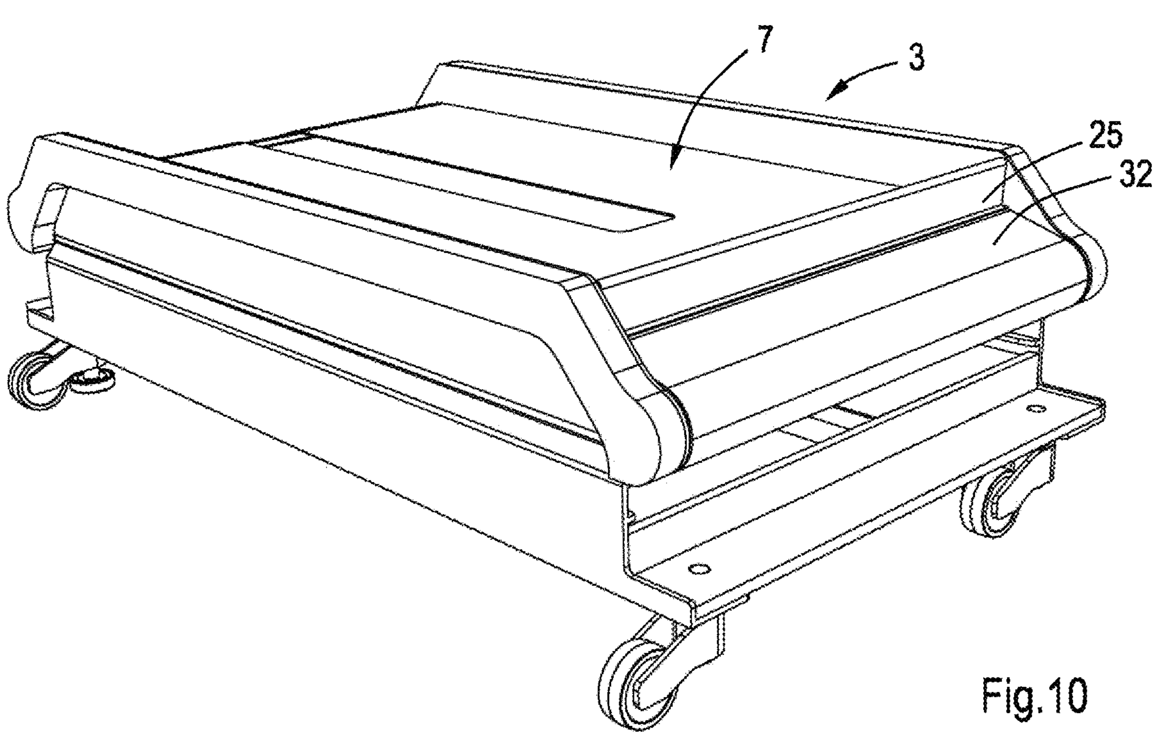
FIG. 10 is a similar view as FIG. 9, but showing the carrier in a different condition.

FIG. 9 shows another alternative embodiment of the carrier 3. In the shown condition the cross-belt 7 is in the transport position. FIG. 10 shows the cross-belt 7 in the discharge position. The product supporting section 11 of the cross-belt 7 has an upper surface including a central region 31 and two end regions 32. The central region 31 is located between the end regions 32 and has a higher friction coefficient than the end regions 32. Each end region 32 extends between the central region 31 and the cross-belt reverse roller 10 located at the same side of the central region 31 as the end region 32. When the cross-belt 7 is operated for discharging a product from the carrier 3 and the product is still located at the end region 32 in the last phase of the discharging action, the cross-belt 7 will decelerate and the product may leave the carrier 3 due to its inertia. The relatively low friction of the end region 32 helps the product to easily slide from the end region 32. In the embodiment as shown in FIGS. 9 and 10 the relatively smooth end regions 32 are combined with the pushing elements 25 and the inclination guides 30, but the low-friction areas may also be applied independent from these features. In other words, the invention is also related to the following aspects:

Aspect 1: A cross-belt sorter, comprising a plurality of interconnected carriers which are drivable behind each other in a conveying direction, wherein each of the carriers is provided with a cross-belt for supporting a product, which cross-belt is drivable in a belt driving direction extending transversely to the conveying direction and guided by cross-belt reverse rollers at opposite sides of the carrier, wherein the cross-belt has a product supporting section between the cross-belt reverse rollers in a transport position of the cross-belt, wherein the upper surface of the product supporting section has a central region which has a higher friction coefficient than an end region extending between the central region and one of the cross-belt reverse rollers which is located with respect to the other cross-belt reverse roller in opposite direction of the belt driving direction. When the cross-belt is operated for discharging a product from the carrier the end region of the product supporting section can still support the product before it is discharged; the relatively low friction of the end region helps the product to leave the cross-belt.

Aspect 2: A cross-belt sorter according to aspect 1, wherein the upper surface of the product supporting section has two end regions having a lower friction coefficient than the central region, wherein each end region extends between the central region and the cross-belt reverse roller located at the same side of the central region as the end region.

Figure 11:
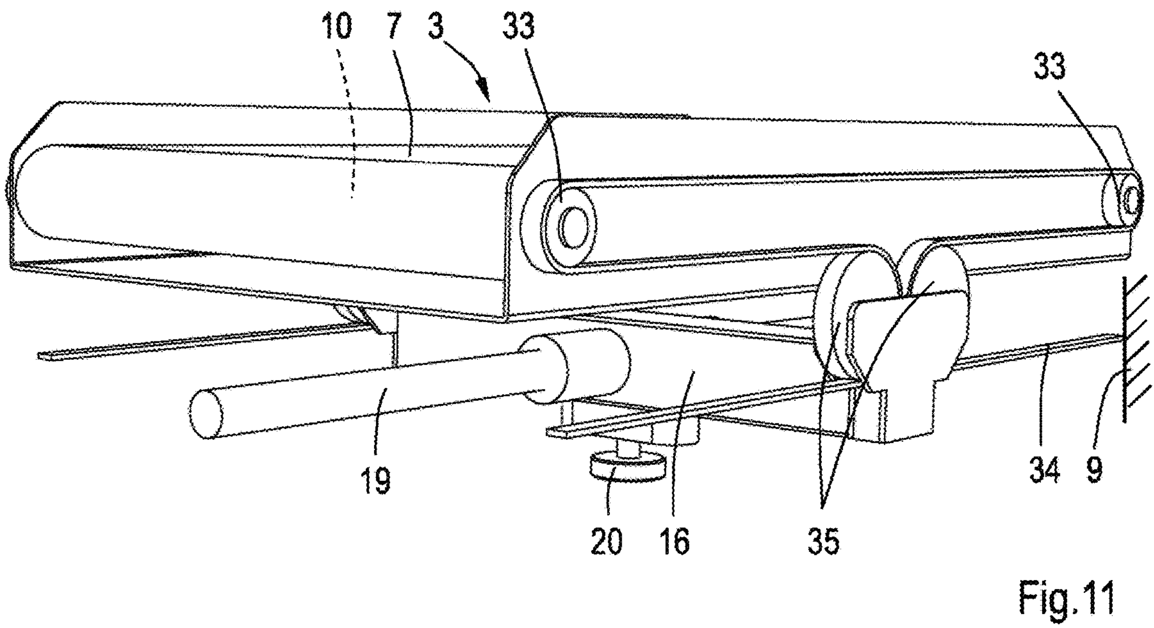
FIG. 11 is a similar view as FIG. 2, but showing an alternative embodiment.
Figure 12:
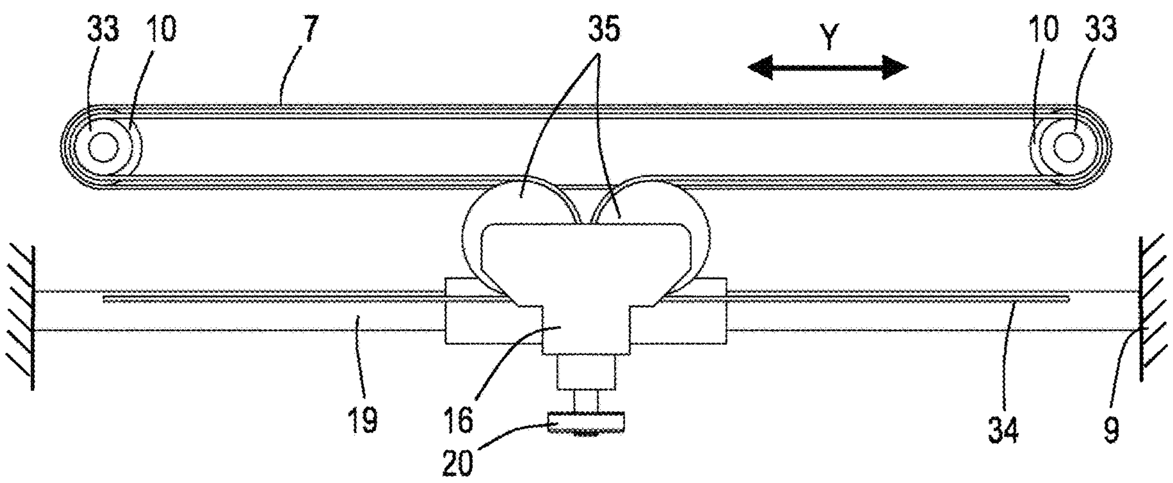
FIG. 12 is a side view of the embodiment as shown in FIG. 11.

FIGS. 11 and 12 show another alternative embodiment of the carrier 3. Parts that correspond to parts in the embodiments as described hereinbefore have the same reference signs. In this case the cross-belt 7 is an endless belt which runs about the cross-belt reverse rollers 10. The cross-belt reverse rollers 10 are driven by driving wheels 33 which are fixed to the reverse rollers 10. The diameters of the cross-belt reverse rollers 10 are larger than the diameters of the driving wheels 33. The driving wheels 33 are driven by a driving belt 34. The follower 16 is provided with freely rotatable reverse wheels 35. Opposite ends of the driving belt 34 are fixed to the carrier frame 9. FIG. 12 shows that the driving belt 34 extends from one fixed end via one reverse wheel 35 to one driving wheel 33 and from there to the other driving wheel 33 and via the other reverse wheel 35 to the opposite fixed end. Moving the follower 16 in one direction along the guide rod 19 leads to a double displacement of the driving belt 34 between the driving wheels 33. The difference of the diameters of the cross-belt reverse rollers 10 and the driving wheels 33 cause a still larger displacement of the cross-belt 7. It is noted that the driving wheels 33, the driving belt 34 and the reverse wheels 35 are located at either side of each carrier 3.

In general terms the invention is also related to a cross-belt sorter, comprising a plurality of interconnected carriers which are drivable behind each other in a conveying direction, wherein each of the carriers is provided with a carrier frame and a drivable endless cross-belt for supporting a product, which cross-belt is movable with respect to the carrier frame in a belt driving direction extending transversely to the conveying direction and guided over cross-belt reverse rollers at opposite sides of the carrier, wherein the cross-belt reverse rollers are provided with respective driving wheels for driving the cross-belt reverse rollers, wherein the carrier comprises a carriage that is movable with respect to the carrier frame opposite to the belt driving direction, which carriage has two freely rotatable reverse wheels, wherein the carrier also comprises a driving belt which has opposite ends that are fixed to the carrier frame which driving belt extends from one fixed end via one reverse wheel to one driving wheel and from there to the other driving wheel and via the other reverse wheel to the opposite fixed end, wherein the driving belt is turned upside down at the driving wheels and the reverse wheels. Alternatively, the opposite ends of the driving belt may be fixed to the carriage whereas the driving belt extends from each fixed end to the respective reverse wheels of the carriage via respective additional reverse wheels that are rotatably mounted to the carrier frame. In the latter case, a displacement of the carriage in one direction leads to more than a double displacement of the driving belt between the driving wheels. The driving belt may be a cable, for example. It is also possible that the driving belt is formed by a chain whereas the driving wheels and the reverse wheels are sprockets.

Figure 13:
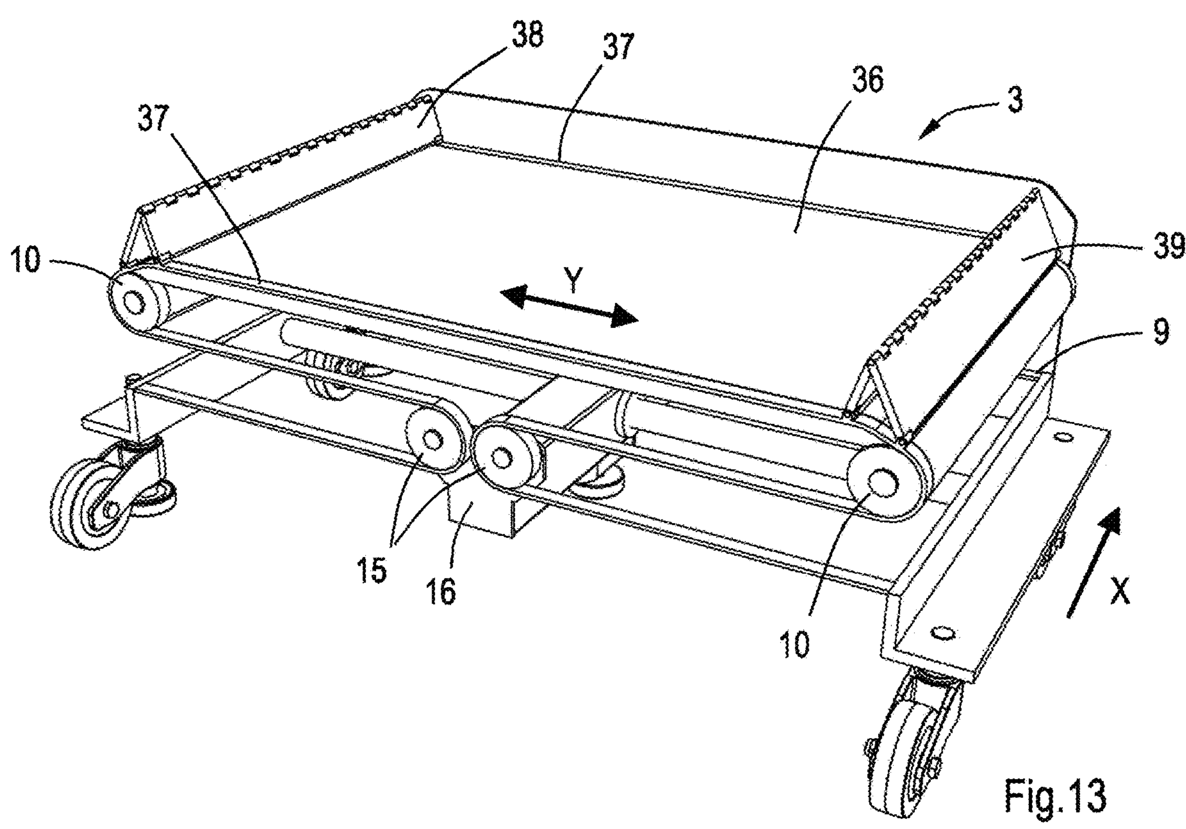
FIG. 13 is a similar view as FIG. 2, but showing an alternative embodiment.
Figure 14:
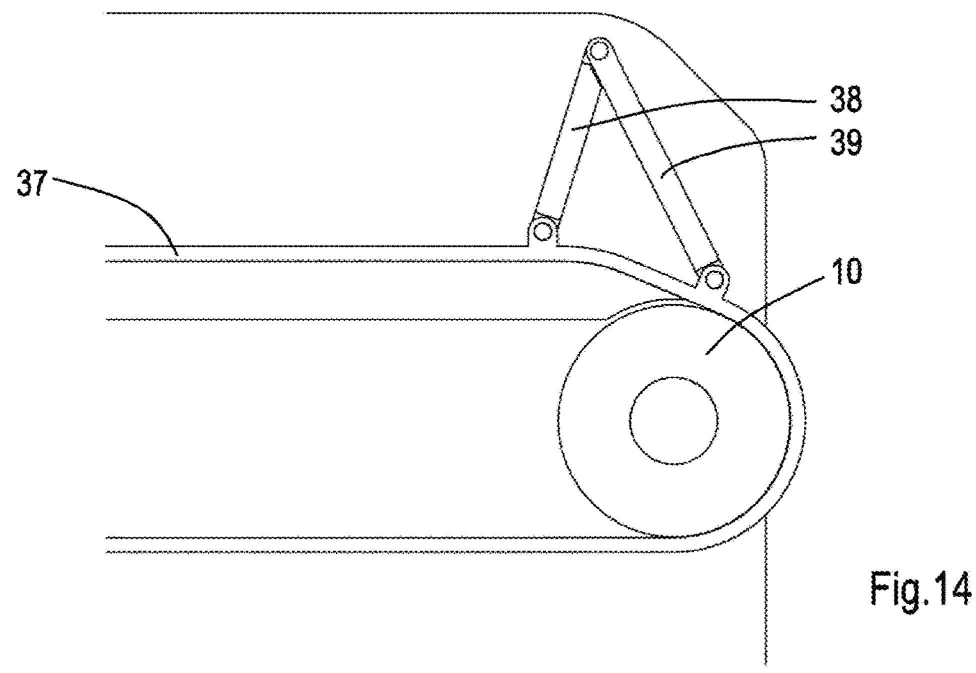
FIG. 14 is a side view of a part of the carrier of FIG. 13 on a large scale.

FIGS. 13 and 14 show another alternative embodiment of the carrier 3. Parts which are similar to parts in other embodiments as described hereinbefore are indicated by the same reference signs. In this embodiment the carrier frame 9 is provided with a bearing surface 36 for supporting a product and two relatively narrow cross-belts 37 which are located next to the bearing surface 36 at either side thereof. The bearing surface 36 may be formed by an upper surface of a flat plate, for example. The carrier 3 is provided with two plate-shaped pushing elements 38 which face each other in a transport position of the cross-belts 37, as shown in FIG. 13. The cross-belts 37 are drivable in opposite belt driving directions Y which extend transversely to the conveying direction X of the carriers 3 of the cross-belt sorter 1. The cross-belts 37 are guided by the cross-belt reverse rollers 10 at opposite sides of the carrier 3.

The cross-belts 37 are drivable by means of the carriage or follower 16 in a similar way as described above, for example in relation to the embodiment as shown in FIG. 3. Each of the cross-belts 37 has opposite ends that are fixed to the carrier frame 9 whereas each cross-belt 37 extends from one fixed end via one follower reverse roller 15 to one of the cross-belt reverse rollers 10 and from there to the other cross-belt reverse roller 10 and via the other follower reverse roller 15 to the opposite fixed end, wherein the cross-belt 37 is turned upside down at the cross-belt reverse rollers 10 and the follower reverse rollers 15. Although using the terms cross-belt reverse rollers and follower reverse rollers herein, it may be clear that these parts may be wheels which are rotatably mounted to the carrier frame 9. Furthermore, the wheels may be sprockets whereas the cross-belts are chains which are engaged by the sprockets.

FIG. 14 shows the pushing element 38 in more detail. The pushing element 38 has an upright orientation with respect to the cross-belts 37 and in transverse direction of the belt driving direction Y. At least during a discharging action one of the pushing elements 38 moves above the bearing surface 36 in order to push a product from the bearing surface 36. The pushing element 38 is supported in the belt driving direction Y by the supporting member 39 which is fixed to the pushing element 38 and to the cross-belts 37 at respective distances from an intersection between the pushing element 38 and the cross-belts 37. In this case the supporting member 39 has also a plate shape and extends in transverse direction of the belt driving direction Y. The pushing element 38 and the supporting member 39 are pivotably mounted to each other and to the cross-belts 37. This provides the opportunity to move the pushing element 38 and the supporting member 39 with respect to each other during travelling about the cross-belt reverse rollers 10.

In the embodiment as shown in FIGS. 13 and 14 the cross-belts 37 do not support a product. This means that during a discharging action the product remains on the bearing surface 36 until one of the pushing elements 36 hits the product and pushes it forwardly. An advantage of this embodiment is that when a product is placed on the bearing surface 36 remote from the pushing element 38 which will push the product, the product will be discharged at a later stage than in case of moving a cross-belt which supports the product, in particular in the event that the product is placed close to the cross-belt reverse roller 10 to which the pushing element 38 is moving. Consequently, the distance along which the product can be discharged as measured along the conveying direction X is relatively short in case of the embodiment as shown in FIG. 13.

In general terms the invention is also related to a cross-belt sorter defined by the following aspects:

Aspect 1: A cross-belt sorter, comprising a plurality of interconnected carriers which are drivable behind each other in a conveying direction, wherein each of the carriers is provided with a carrier frame including a bearing surface for supporting a product and a cross-belt which is located next to the bearing surface and drivable in a belt driving direction extending transversely to the conveying direction, wherein the cross-belt is guided by cross-belt reverse rollers at opposite sides of the carrier, wherein a pushing element is mounted to the cross-belt for pushing a product from the bearing surface, wherein the pushing element has an upright orientation with respect to the cross-belt and extends in transverse direction of the belt driving direction such that it is located above the bearing surface during a discharging action. Hence, a product can be wiped from the bearing surface during a discharging action.

Aspect 2: A cross-belt sorter according to aspect 1, wherein the carrier comprises a follower that is movable with respect to the carrier frame opposite to the belt driving direction, which follower has two freely rotatable follower reverse rollers including parallel axes of rotation, wherein the cross-belt has opposite ends that are fixed to the carrier frame whereas the cross-belt extends from one fixed end via one follower reverse roller to one of the cross-belt reverse rollers and from there to the other cross-belt reverse roller and via the other follower reverse roller to the opposite fixed end, wherein the cross-belt is turned upside down at the cross-belt reverse rollers and the follower reverse rollers. Alternatively, the opposite ends of the cross-belt may be fixed to the follower whereas the cross-belt extends from each fixed end to the respective follower reverse rollers of the follower via respective additional reverse rollers that are rotatably mounted to the carrier frame. In the latter case, a displacement of the follower in one direction leads to more than a double displacement of the cross-belt.

Aspect 3: A cross-belt sorter according to aspect 1 or 2, wherein the pushing element is supported in the belt driving direction by a supporting member which is fixed to the pushing element and to the cross-belt at respective distances from an intersection between the pushing element and the cross-belt.

Aspect 4: A cross-belt sorter according to any one of the preceding aspects, wherein at least one of the pushing element and the supporting member has a plate shape extending in transverse direction of the belt driving direction.

Aspect 5: A cross-belt sorter according to any one of the preceding aspects, wherein the pushing element and the supporting member are pivotably mounted to each other and to the cross-belt.

Aspect 6: A cross-belt sorter according to any one of the preceding aspects, wherein the pushing element and the supporting element form a first pushing element and a first supporting element, whereas second pushing and supporting elements similar to the first pushing and supporting elements are mounted to the cross-belt, wherein the first and second pushing elements face each other in a transport position of the cross-belt.

Aspect 7: A cross-belt sorter according to aspect 6, wherein the cross-belt is drivable in opposite directions by means of a follower which engages the cross-belt and which is located at a lower side of the carrier and guidable by controllable guides such that the cross-belt is driven in one of said directions upon passing an activated guide.

Aspect 8: A cross-belt sorter according to any one of the preceding aspects, wherein the cross-belt is a first cross-belt which is located at one side of the bearing surface and the carrier is provided with a second cross-belt which is located at the opposite side of the bearing surface, wherein the pushing element(s) is (are) mounted to the cross-belts and the cross-belts are drivable synchronously.

The invention is not limited to the embodiments shown in the drawings and described hereinbefore, which may be varied in different manners within the scope of the claims and their technical equivalents. For example, the cross-belt may be of different types, such as a sheet-shaped belt made of polyester, rubber, and the like, or a belt including interconnected discrete slats.

The invention claimed is:

1. A cross-belt sorter comprising a plurality of interconnected carriers which are drivable behind each other in a conveying direction, wherein each of the carriers is provided with a cross-belt that provides a product supporting section for supporting a product, which cross-belt is drivable in a belt driving direction extending transversely to the conveying direction, first and second pushing elements are mounted to each said cross-belt for pushing against a product on the product supporting section of the cross-belt in the event that the product on the product supporting section of the cross-belt tends to move with respect to the cross-belt in a direction opposite the belt driving direction, and each said carrier is provided with two side walls along the cross-belt, such that in a neutral position of the cross-belt the first and second pushing elements, the two side walls and the product supporting section of the cross-belt form a four-sided tray.

2. The cross-belt sorter according to claim 1 wherein each of said first and second pushing elements has an upright orientation with respect to the cross-belt and is supported in the belt driving direction by a supporting member which is at least between opposite side edges of the cross-belt that is fixed to each of said first and second pushing elements and to the cross-belt at respective distances from an intersection between each of said first and second pushing elements and the cross-belt.

3. The cross-belt sorter according to claim 2, wherein a smallest angle of each of the first and second pushing elements with respect to the cross-belt is larger than the smallest angle of the supporting member with respect to the cross-belt.

4. The cross-belt sorter according to claim 2, wherein at least one of the first and second pushing elements and the supporting member has a plate shape extending in a transverse direction relative to the belt driving direction.

5. The cross-belt sorter according to claim 2, wherein each of said first and second pushing elements and each said supporting member are pivotably mounted to each other and to each said cross-belt.

6. The cross-belt sorter according to claim 2, wherein each of said first and second pushing elements and each said supporting member are made of the same material.

7. The cross-belt sorter according to claim 6, wherein each of said first and second pushing elements and each said supporting member are an integral unit.

8. The cross-belt sorter according to claim 2, wherein the first and second pushing elements face each other in a neutral position of the cross-belt.

9. The cross-belt sorter according to claim 8, wherein each said cross-belt is drivable in opposite directions by means of a follower which engages the cross-belt and which is located at a lower side of the carrier and is guidable by controllable guides such that the cross-belt is driven by the follower in one of said directions upon passing an activated guide.

10. The cross-belt sorter according to claim 1, wherein each said cross-belt is guided by cross-belt reverse rollers at opposite sides of the carrier, and adjacent to at least one of the cross-belt reverse rollers the carrier is provided with an inclination guide for guiding the cross-belt between said cross-belt reverse roller and an elevated level above the cross-belt reverse roller at a distance from the cross-belt reverse roller.

11. The cross-belt sorter according to claim 10, wherein the inclination guide has a gradual inclination.

12. The cross-belt sorter according to claim 1, wherein each of the carriers is provided with a carrier frame, each said cross-belt is movable with respect to each said carrier frame in the belt driving direction and guided over cross-belt reverse rollers at opposite sides of the carrier, each said cross-belt has a product supporting section which extends between the cross-belt reverse rollers in a transport position of the cross-belt and two reverse portions at either side of the product supporting section, respectively, which reverse portions extend below the product supporting section in the transport position, and each said reverse portion has a first reverse section extending from one of the cross-belt reverse rollers to a dynamic reverse roller for turning the reverse portion upside down, which said dynamic reverse roller is rotatably mounted to a carriage that is movable with respect to the carrier frame opposite to the belt driving direction, and a second reverse section located below the first reverse section and extending away from the dynamic reverse roller, which said second reverse section is fixed to the carrier frame at a distance from the dynamic reverse roller or to the carriage via an additional reverse roller at the carrier frame, and each reverse portion is separated into two parts for providing an opening, between which the carriage can move with respect to the carrier frame.

13. The cross-belt sorter according to claim 12, wherein the opening is located at a centre of the cross-belt as seen in the conveying direction.

14. The cross-belt sorter according to claim 1, wherein each of the carriers is provided with a carrier frame and the cross-belt is movable with respect to the carrier frame in the belt driving direction and guided over cross-belt reverse rollers at opposite sides of the carrier, the product supporting section which extends between the cross-belt reverse rollers in a transport position of the cross-belt and two reverse portions at either side of the product supporting section, respectively, which reverse portions extend below the product supporting section in the transport position, and each reverse portion has a first reverse section extending from one of the cross-belt reverse rollers to a common reverse roller for turning the reverse portion upside down, which said common reverse roller is rotatably mounted to a carriage that is movable with respect to the carrier frame opposite to the belt driving direction, and a second reverse section located below the first reverse section and extending away from the common reverse roller, which second reverse section is fixed to the carrier frame at a distance from the common reverse roller or to the carriage via an additional reverse roller at the carrier frame, and the first and second reverse sections of each reverse portion have an offset with respect to each other in longitudinal direction of the common reverse roller.

15. The cross-belt sorter according to claim 12, wherein the carriage is provided with a follower which is located at a lower side of the carrier and guidable by controllable guides such that the carriage is driven upon passing an activated guide.

16. The cross-belt sorter according to claim 1, wherein the cross-belt is guided by cross-belt reverse rollers at opposite sides of the carrier, the product supporting section is located between the cross-belt reverse rollers in a transport position of the cross-belt, and an upper surface of the product supporting section has a central region which has a higher friction coefficient than an end region thereof extending between the central region and one of the cross-belt reverse rollers which is located with respect to the other cross-belt reverse roller in an opposite direction of the belt driving direction.

17. A cross-belt sorter comprising a plurality of interconnected carriers which are drivable behind each other in a conveying direction, wherein each of the carriers is provided with a cross-belt for supporting a product, which cross-belt is drivable in a belt driving direction extending transversely to the conveying direction, first and second pushing elements are mounted to each said cross-belt for pushing against a product on the cross-belt in the event that the product on the cross-belt tends to move with respect to the cross-belt in a direction opposite the belt driving direction, and each said pushing element and each said supporting member are pivotably mounted to each other and to the cross-belt and each said carrier is provided with two side walls along the cross-belt, such that in a neutral position of the cross-belt the first and second pushing elements, the two side walls and the product supporting section of the cross-belt form a four-sided tray.

18. The cross-belt sorter according to claim 17, wherein each said pushing element has an upright orientation with respect to the cross-belt and is supported in the belt driving direction by a supporting member which is at least between opposite side edges of the cross-belt, the supporting member is fixed to the pushing element and to the cross-belt at respective distances from an intersection between the pushing element and the cross-belt.

19. A cross-belt sorter comprising a plurality of interconnected carriers which are drivable behind each other in a conveying direction, wherein each of the carriers is provided with a cross-belt for supporting a product, which cross-belt is drivable in a belt driving direction extending transversely to the conveying direction, wherein first and second pushing elements are mounted to each said cross-belt for pushing against a product on the cross-belt in the event that the product on the cross-belt tends to move with respect to the cross-belt in a direction opposite the belt driving direction, each said cross-belt is guided by cross-belt reverse rollers at opposite sides of the carrier, and adjacent to at least one of the cross-belt reverse rollers the carrier is provided with an inclination guide for guiding the cross-belt between said cross-belt reverse roller and an elevated level above the cross-belt reverse roller at a distance from the cross-belt reverse roller.

20. The cross-belt sorter according to claim 19, wherein the inclination guide has a gradual inclination.

21. The cross-belt sorter according to claim 19, wherein each said pushing element has an upright orientation with respect to the cross-belt and is supported in the belt driving direction by a supporting member which is at least between opposite side edges of the cross-belt that is fixed to the pushing element and to the cross-belt at respective distances from an intersection between the pushing element and the cross-belt.

* * * * *